United States Patent [19]
Rodal et al.

[11] Patent Number: 6,115,595
[45] Date of Patent: Sep. 5, 2000

[54] INTEGRATED CIRCUIT USING A POWER SUPPLY INPUT FOR DIGITAL LOGIC

[75] Inventors: Eric B. Rodal, Morgan Hill; Chung Y. Lau, Sunnyvale, both of Calif.

[73] Assignee: Trimble Navigation Limited, Sunnyvale, Calif.

[21] Appl. No.: 09/071,977

[22] Filed: May 4, 1998

[51] Int. Cl.[7] .................................................. H04B 1/28
[52] U.S. Cl. ..................... 455/333; 455/323; 455/456; 342/357.12
[58] Field of Search ........................ 455/333, 343, 455/456, 457, 314, 323; 342/357.1, 357.12; 701/213

[56] References Cited

U.S. PATENT DOCUMENTS 5,504,684   4/1996   Lau et al. .............................. 342/357.1

*Primary Examiner*—Lee Nguyen
*Attorney, Agent, or Firm*—David R. Gildea

[57] ABSTRACT

A GPS receiver including an RF GPS integrated circuit downconverter having a standby mode controlled by a power supply input used as a logic signal. The RF GPS integrated circuit includes a synthesizer for generating LO signals, first and second downconverters for using the LO signals for downconverting the GPS signal, and a sampler for using a clock signal for providing in-phase and quadrature phase sampled output signals representative of the GPS signal. The synthesizer includes a multi-mode divider for providing substantially the same first LO frequency at about the midpoint of the L1 and L2 GPS frequencies when either of an external or internally generated reference frequency is selected. A GPS digital signal processor integrated circuit issues the logic signal and the clock signal from a single pin.

14 Claims, 3 Drawing Sheets

INTEGRATED CIRCUIT USING A POWER SUPPLY INPUT FOR DIGITAL LOGIC

BACKGROUND OF THE INVENTION

1. Field of the Invention

The invention relates generally to integrated circuits and more particularly to a single chip RF integrated circuit GPS downconverter having a standby mode controlled by a power supply input used as a logic signal.

2. Description of the Prior Art

Global Positioning System (GPS) receivers determine location, velocity, and time by receiving and processing information in GPS signals received from GPS satellites that have been placed in orbit around the Earth by the United States Government. Each GPS satellite uses a distinct pseudo-random noise (prn) code for spreading data for the location-in-space and time-of-transmission for that satellite and transmits the spread data on a carrier frequency that is the same for all the satellites. A GPS receiver uses the distinct prn code for distinguishing the GPS signal from typically at least four satellites and then finds its own location, velocity, and time by solving simultaneous equations using the relative times that the signal from each of the satellites arrives at the receiver and the locations-in-space and times-of transmission from the satellites.

There is a need for improving the state-of-the-art of GPS receivers in terms of reducing their size, power consumption, and cost. One of the major components in determining the size, power, and cost in the GPS receiver is the radio frequency (RF) circuitry at the front end for downconverting the GPS satellite carrier frequency to an intermediate or baseband frequency. A second major factor is the digital signal processor (DSP) circuitry for processing the signal at the intermediate or baseband frequency for providing GPS signal correlations. Due to the relatively high frequency of the GPS satellite signal, most GPS receivers until recently have used discrete components for the front end RF circuitry. Although the performance of such RF circuitry may be very good, these discrete components represent a large portion of the size, power, and cost of a modern GPS receiver. Gallium Arsenide (GaAs) integrated circuits (IC)s have been developed using field effect transistors (FET)s as active devices for replacing the majority of the discrete components in the RF circuitry. Unfortunately, GaAs ICs have been and continue to be relatively expensive because the commercial manufacturing volume of GaAs ICs is low and because the GaAs material is more expensive than Silicon and the processing steps in manufacturing a GaAs IC are relatively difficult. Silicon bipolar ICs using bipolar transistors as active devices have been used for the front end RF circuitry in the GPS receiver. Such ICs can be more difficult to design because the frequency response, noise figure, and power consumption for the silicon IC bipolar transistors are typically not as good as for the GaAs IC FETs. However, the silicon bipolar ICs are less costly and have recently been shown to have sufficient performance for most applications. There continues to be a need for improvements in RF ICs in order to improve performance and reduce size, power consumption, and cost in a GPS receiver.

The size and power consumption of both the DSP and the RF integrated circuits can be reduced by using improvements in the manufacturing processes for fabricating and packaging silicon chips. Power consumption is further effectively reduced by having a standby mode in which some or all of the circuits are turned off. Over a given period of time the GPS receiver will spend some time operating normally and some time in the standby mode so the effective power consumption is the time weighted average of the standby and normal modes. However, a limiting factor on the size of both the RF and the DSP integrated circuits is the number of pins that are required for supplying power and clocks and passing signals in and out of the chips. Typically, several separate power pins are required for the RF IC in order to prevent unwanted signal coupling between circuits within the RF IC, several clock signals are passed back and forth between the RF IC and the DSP IC, and at least one separate pin is used for controlling the standby mode. It would be desirable to reduce the pin count in one or both of the RF IC and DSP IC by having multiple functions performed through a single pin.

SUMMARY OF THE INVENTION

It is therefore an object of the present invention to provide a low cost radio frequency (RF) global positioning system (GPS) integrated circuit (IC) using a voltage input for supplying operating power and as a logic signal for selecting among operational modes.

Another object of the present invention is to provide a GPS digital signal processor using a single pin for providing either a required signal for use in an operational mode or a logic signal for selecting among operational modes.

Briefly, in a preferred embodiment, a GPS RF integrated circuit (IC) of the present invention includes a synthesizer for providing a first local oscillator (LO) signal and a complex second LO signal, a first downconverter using the first LO signal for converting a GPS L1 or L2 frequency signal to a first intermediate frequency (IF) signal, a second downconverter using the second LO signal for converting the first IF signal to a complex second IF signal, and a sampler using a clock signal received from a GPS DSP IC for sampling the second IF signal and issuing I and Q sampled signals. The synthesizer includes an amplifier/oscillator for selectably receiving an external reference signal or generating an internal reference signal using an external resonator and a multi-mode divider for frequency dividing the second LO signal by a first or a second divide number so that the first and second LO frequencies do not change significantly when the reference frequency is changed.

A GPS receiver of the present invention includes a narrow bandpass radio frequency (RF) filter for filtering a GPS signal at the GPS satellite signal frequency, the RF GPS integrated circuit (IC) for receiving the filtered GPS signal and issuing a downconverted signal, a GPS digital signal processor (DSP) for receiving the downconverted signal and issuing a correlation signal, and a microprocessor system for processing the correlation signal and providing a GPS-based location.

The GPS RF IC includes a power logic circuit using a Vcc_DIG power supply input and an OSC_ON control signal and as logic signals for determining when the RF GPS integrated circuit operates in a standby mode where the power consumption in the synthesizer, first and second downconverters, and sampler circuits is reduced or eliminated. The OSC_ON control signal is provided by the same pin of the GPS DSP IC as the clock signal for the sampler. During the standby mode the RF GPS IC continues to receive or generate and issue the selected reference signal.

These and other objects of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
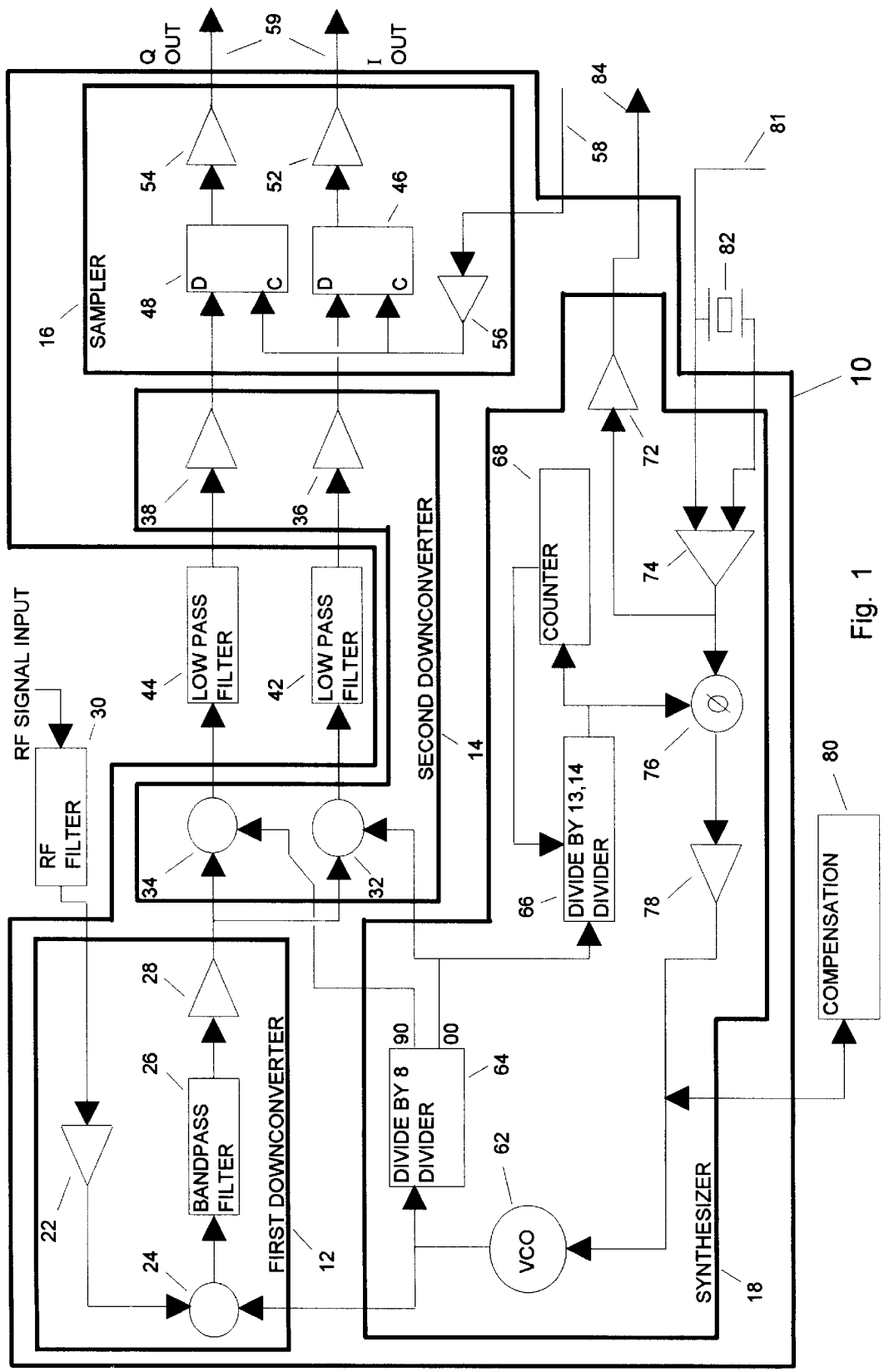
FIG. 1 is a block diagram of an RF GPS integrated circuit downconverter of the present invention.

FIG. 1 illustrates a radio frequency (RF) integrated circuit of the present invention referred to by the general reference number 10 for receiving a global positioning system (GPS) signal. The integrated circuit 10 includes a first downconverter 12, a second downconverter 14, a sampler 16, and a synthesizer 18. The first downconverter 12 includes a low noise amplifier (LNA) 22, a mixer 24, a low pass filter 26, and an amplifier 28 for receiving a radio frequency input signal. Typically, the RF signal passes through an RF filter 30 before reaching the integrated circuit 10. The LNA 22 receives an RF input signal from outside the integrated circuit 10 and passes an amplified RF signal to the mixer 24. The mixer 24 uses a first local oscillator ($LO_1$) signal received from the synthesizer 18 to downconvert the frequency of the amplified RF signal and passes the downconverted signal to the low pass filter 26. The low pass filter 26 filters the downconverted signal and passes a filtered signal to the amplifier 28. The amplifier 28 amplifies the filtered signal and passes the amplified signal as a first intermediate frequency (IF) signal the second downconverter 14.

The second downconverter 14 includes a pair of mixers 32 and 34 and a pair of amplifiers 36 and 38. The first IF signal is split and passed to each of the mixers 32 and 34. The mixer 32 uses an in-phase (I) component of a complex second local oscillator ($LO_2$) signal received from the synthesizer 18 to frequency downconvert the first IF signal to an I channel second IF signal; and the mixer 34 uses a quadrature (Q) component of the complex second $LO_2$ signal received from the synthesizer 18 to frequency downconvert the first IF signal to a Q channel IF signal. The I and Q channels of the complex second IF signal are passed off chip through low pass filters 42 and 44 and received back on chip to the amplifiers 36 and 38. The amplifiers 36 and 38 amplify the signals and pass the I and Q signals to the sampler 16.

The sampler 16 includes a pair of D flip-flops 46 and 48, a pair of output amplifiers 52 and 54, and a clock input amplifier 56. The clock input amplifier 56 amplifies a sampling clock input signal received from a path 58 and passes the amplified clock signal to clock inputs (C) of the D flip-flops 46 and 48. The D flip-flops 46 and 48 receive the I and Q second IF signal components at D inputs and use an edge of the amplified clock signal for providing sampled I and Q signals at I and Q outputs, respectively. The sampled I and Q signals are amplified by the output amplifiers 52 and 54 and then passed out of the integrated circuit 10 as I and Q output signals.

The synthesizer 18 includes a voltage controlled oscillator 62, a divide-by-eight divider 64, a divide-by-thirteen, fourteen divider 66, a counter 68, a clock output amplifier 72, a reference amplifier/oscillator 74, a phase detector (Ø) 76, and an error voltage amplifier 78. The divide-by-eight divider 64 uses a divide-by-two divider followed by a divide-by-four Johnson counter to establish a fixed 90° phase offset. The VCO 62, the divider 64, the divider 66, the phase detector 76, the error voltage amplifier 78, and an off-chip compensation circuit 80 act as a phase lock loop to synchronize the frequency of the $LO_1$ and $LO_2$ signals to a reference signal from a path 81 having a reference frequency of either thirteen megahertz or twelve point five zero four (12.504) megahertz. The VCO 62 generates the $LO_1$ signal having a frequency controlled by an amplified error voltage signal provided by the error voltage amplifier 78. The $LO_1$ signal is frequency divided by eight by the divider 64 and split into the $LO_2$ I (0°) and Q (90°) components used in the second downconverter 14. The $LO_2$ I component is frequency divided by either thirteen or fourteen in the divider 66 as controlled by a divide selection signal from the counter 68. The divider 66 then passes a frequency divided feedback signal to the counter 68 and the phase detector 76.

The reference amplifier/oscillator 74 uses positive feedback around a differential amplifier for generating the reference signal or uses the differential amplifier for amplifying an externally generated reference signal. For operation as an oscillator, a crystal resonator 82 having a desired resonant frequency is connected between two emitter coupled inputs to the amplifier/oscillator 74. For operation as an amplifier the inputs of the amplifier/oscillator 74 receive the externally generated reference signal on the path 81. The reference amplifier/oscillator 74 passes the reference signal to the phase detector 76. The phase detector 76 provides an error voltage proportional to a difference in phases between the amplified reference signal and the feedback signal received from the divider 66. The compensation circuit uses a capacitor or a combination of one or more capacitors and/or resistors for frequency stability by adding the appropriate poles and zeros for stabilizing the loop. The clock output amplifier 72 receives the reference signal from the reference amplifier/oscillator 74 and issues a reference signal output on a path 84.

The integrated circuit 10 has a first mode using the thirteen megahertz reference frequency and a second mode using the twelve point five zero four megahertz reference frequency. The feedback signal provided by the divider 66 is a pulse stream having an average pulse rate that is driven by the action of the loop to match the frequency of the reference signal. The divide select signal provided by the counter 68 causes the divider 66 to divide by thirteen or by fourteen. In the first mode the counter 68 counts the frequency divided signal from the divider 66 to fifteen and provides a divide select signal causing the divider 66 to frequency divide the $LO_2$ frequency in repeating sequences of 13, 14, 13, 14, 13, 14, 13, 14, 13, 14, 13, 14, 13, 14, and 13. The average divide number in the divider 66 is found by dividing the sum of thirteen times eight plus fourteen times seven frequency by the sum of eight plus seven as shown in a general equation 1 below.

$$\text{Average divide number} = (A_N * A_t + B_N * B_t)/(A_t + B_t) \tag{1}$$

In the equation 1, in a preferred embodiment where $A_N$ is thirteen, $A_t$ is eight, $B_N$ is fourteen, and $B_t$ is seven, the average divide number equals two-hundred two divided by fifteen (202/15) or thirteen point four followed by sixes (13.466666). Accordingly, in the first mode, the $LO_2$ signal has a nominal frequency of 175.067 megahertz and the $LO_1$ signal has a nominal frequency of 1400.533 megahertz. In the second mode the counter 68 provides the divide selection signal having the second logic level thereby controlling the divider 66 to divide by fourteen. Accordingly, in the second mode $LO_2$ signal has a nominal frequency of about 175.056 megahertz and the $LO_1$ signal has a nominal frequency of about 1400.448 megahertz. For an L1 GPS frequency of 1575.42 megahertz, the first downconverted signal has a center frequency of approximately 174.887 megahertz or 174.972 megahertz for the first and second modes, respectively; and the second downconverted signal has a center frequency of approximately 180 kilohertz or 84 kilohertz for the first and second modes, respectively. For an L2 GPS frequency of 1227.60 megahertz, the first downconverted signal has a center frequency of approximately 172.933 megahertz or 172.848 megahertz for the first and second modes, respectively, and the second downconverted signal has a center frequency of 2.13 megahertz or 2.21 megahertz in the first and second modes, respectively. Importantly, the center frequencies of the first IF signals for the L1 and L2 GPS frequencies for either reference frequency are close enough to enable the integrated circuit 10 to use a single low pass filter 26 and the second IF frequency is low enough for the sampled signals to be inexpensively processed by a following digital processor. It will be appreciated that the above scheme is not limited to an average divide number of two-hundred two divided by fifteen or for reference frequencies of only thirteen and twelve point five zero four megahertz. The sampling clock input signal on the path 58 received from a GPS digital signal processor (DSP) section 86 (FIG. 2) has a frequency equal or harmonically related to the reference frequency. In a preferred embodiment the frequency is ¼ the reference frequency or 3.25 megahertz or 3.126 megahertz for the first and second modes, respectively. The RF filter 30 for receiving the GPS signal has a passband for the GPS L1 frequency of 1575.42 megahertz or the GPS L2 frequency of 1227.60 megahertz.

Figure 2:
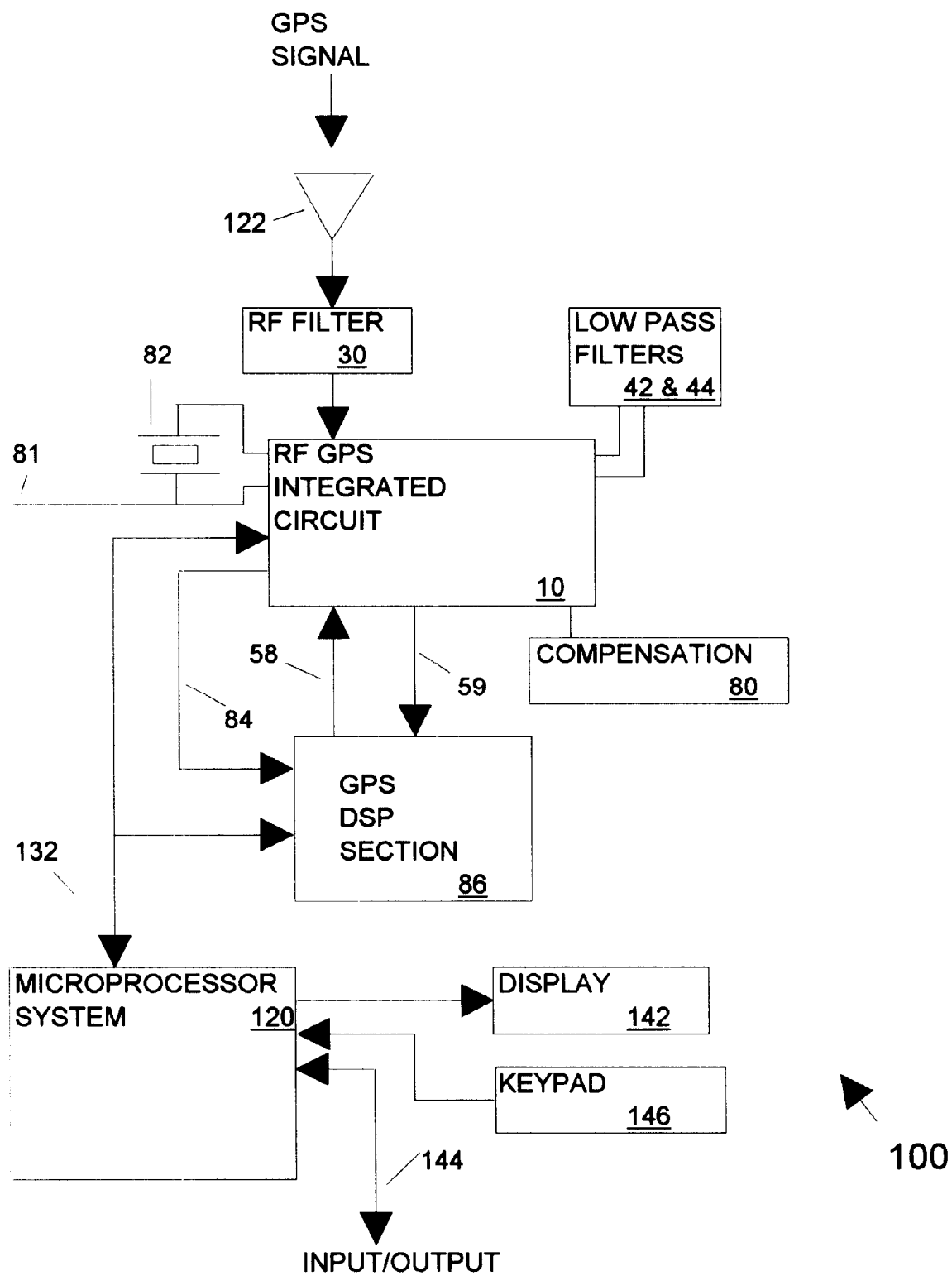
FIG. 2 is a block diagram of a GPS receiver of the present invention using the RF GPS integrated circuit of FIG. 1.

FIG. 2 illustrates a global positioning system receiver of the present invention referred to by the general reference number 100. The GPS receiver 100 includes the RF GPS integrated circuit 10, the RF filter 30, the low pass filters 42 and 44, the compensation 80, and the crystal resonator 82 as described in detail in the description accompanying FIG. 1; and includes the GPS DSP section 86, a microprocessor system 120, and a GPS antenna 122. The external reference signal on the path 81 is received by the RF GPS integrated circuit 10 from an internal or external signal source. The integrated circuit 10 then selects the external reference signal or generates the reference signal using the resonator 82 and distributes the selected reference signal through the path 84 to the GPS DSP section 86, thereby enabling the same RF GPS integrated circuit 10 and GPS receiver 100 to use either one of two frequencies as a reference. Preferably, the GPS DSP section 86 divides the reference signal from the path 84 by four and returns the divided signal back to the RF GPS integrated circuit 10 through the path 58 as the sampling clock input signal. Alternatively, the GPS DSP section 86 may return the sampling clock input signal back to the RF GPS integrated circuit 10 at another harmonically related frequency or at the same frequency.

The GPS antenna 122 receives a GPS RF signal and passes the signal through the RF filter 30 to the RF GPS integrated circuit 10. The RF GPS integrated circuit 10 downconverts the RF signal to representative I and Q low frequency signals as described above and passes the I and Q signals through the path 59. The GPS DSP section 86 receives the I and Q signals through the path 59 and cooperates with the microprocessor system 120 over a bus 132 to acquire and track the GPS signal by generating a replica signal and correlating and synchronizing the replica signal to the I and Q signals. While the GPS signal is being tracked, the GPS DSP section 86 passes correlation signals including GPS location-determination information for the health and locations-in-space, phase observations, and Doppler frequencies of the GPS satellites over the bus 132 to the microprocessor system 120. Details of the downconversion and correlation of the GPS signal are described in U.S. Pat. No. 4,672,629 entitled "Receiver for Bandspread Signals" by Beier and U.S. Pat. No. 5,402,347 entitled "Satellite Search Methods For Improving Time To First Fix In A GPS Receiver" by McBurney et al. The teachings of these patents are incorporated herein by reference. The microprocessor system 120 then uses the GPS information for calculating the location and velocity of the GPS antenna 122 and time. The processed information for location, velocity, and/or time is then passed to a display 142 for visual presentation and/or through a path 144 as a serial digital output. A user enters requests to the microprocessor system 120 through a keypad 146 or through as a serial digital input through the path 144. The microprocessor system 120 includes a memory including a pre-programmed code for processing the requests and controlling the elements of the GPS receiver 100.

Figure 3:
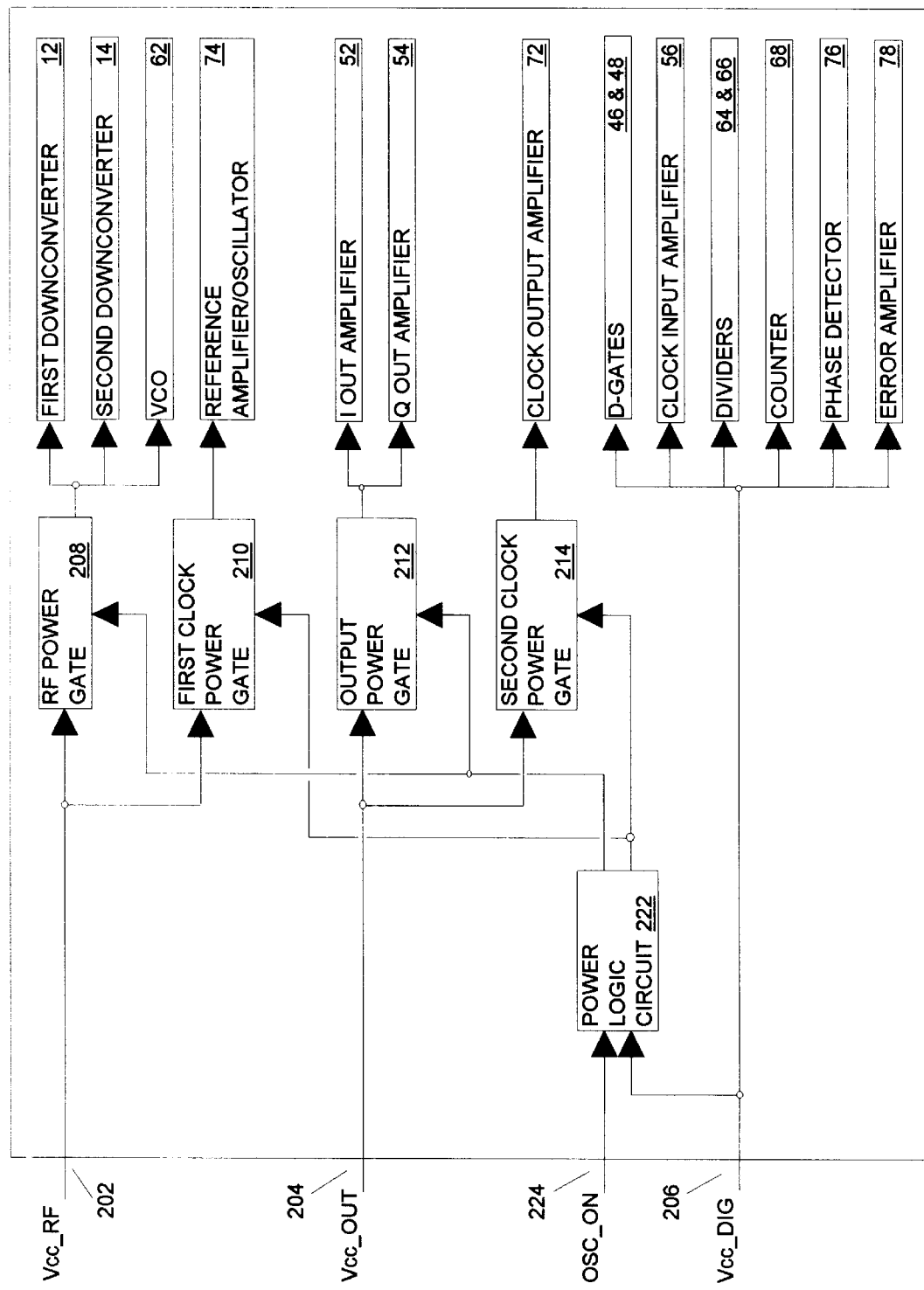
FIG. 3 is a diagram of the power distribution for a standby mode in the RF GPS integrated circuit downconverter of FIG. 1.

FIG. 3 is a block diagram illustrating the manner in which the integrated circuit 10 (FIG. 1) is powered. The integrated circuit 10 includes three modes—an ALL ON mode for normal operation, an ALL OFF mode, and a standby mode. The ALL ON mode powers all the circuits in the IC 10. The ALL OFF mode inhibits power to all the circuits. The standby mode provides the reference signal by supplying power to the clock output amplifier 72 and the reference amplifier/oscillator 74 and reduces power consumption by inhibiting power to all other circuits. The IC 10 includes a Vcc_RF input 202, a Vcc_out input 204, and a Vcc_DIG input 206 having nominal output voltages in a range of 1.5 volts to 5.0 volts and a ground voltage. The Vcc_RF input 202 provides power through an RF power gate 208 to the first downconverter 12, the second downconverter 14, and the VCO 62; and through a first clock power gate 210 to the reference amplifier/oscillator 74. The Vcc_out input 204 provides power through an output power gate 212 to the I and Q output amplifiers 52 and 54; and through a second clock gate 214 to the clock output amplifier 72. The Vcc_DIG input 206 provides power to the D flip-flops 46 and 48, the clock input amplifier 56, the dividers 64 and 66, the counter 68, the phase detector 76, and the error amplifier 78. A power logic circuit 222 uses the Vcc_DIG input 206 and an OSC_ON input 224 for controlling the modes according to table 1 below. In the table 1, a "high" level signifies a voltage within about 0.5 volts of the nominal output voltage and a low level signifies a voltage within about 0.5 volts of the ground voltage.

TABLE 1

|  | Vcc_DIG | OSC_ON | Vcc_RF | Vcc_out |
|---|---|---|---|---|
| ALL ON | high | don't care | high | high |
| ALL OFF | low | low | don't care | don't care |
| standby mode | low | high | high | high |

In the ALL ON mode, the Vcc_RF input 202, Vcc_out input 204, and Vcc_DIG input 206 are all high. Power from the Vcc_DIG input 206 passes to the D flip-flops 46 and 48, the clock input amplifier 56, the dividers 64 and 66, the counter 68, the phase detector 76, and the error amplifier 78. The power logic circuit 222 receives the high for the Vcc_DIG input 206 and controls the RF power gate 208 to pass the power from the Vcc_RF input 202 to the first downconverter 12, the second downconverter 14, and the VCO 62; the first clock power gate 210 to pass power from the Vcc_RF input 202 to the reference amplifier/oscillator 74; the output power gate 212 to pass power from the Vcc_out input 206 to the I and Q output amplifiers 52 and 54; and the second clock power gate 214 to pass power from the Vcc_out input 206 to the clock output amplifier 72.

In the ALL OFF mode the Vcc_DIG input 206 and the OSC_ON input 224 are low. Since the Vcc_DIG input 206 is low, no power passes to the D flip-flops 46 and 48, the clock input amplifier 56, the dividers 64 and 66, the counter 68, the phase detector 76, and the error amplifier 78. The power logic circuit 222 receives the low level in both the Vcc_DIG input 206 and the OSC_ON input 224 and controls the RF power gate 208 to prevent the power from the Vcc_RF input 202 from passing to the first downconverter 12, the second downconverter 14, and the VCO 62; controls the first clock power gate 210 to prevent the power from the Vcc_RF input 202 from passing to the reference amplifier/oscillator 74; controls the output power gate 212 to prevent the power from the Vcc_out input 204 from passing to the I and Q output amplifiers 52 and 54; and controls the second clock power gate 214 to prevent the power from the Vcc_out input 204 from passing to the clock output amplifier 72.

In the standby mode, the Vcc_RF input 202, the Vcc_out input 204 are high, and the OSC_ON input 224 are high; and the Vcc_DIG input 206 is low. Since the Vcc_DIG input 206 is low, no power passes to the D flip-flops 46 and 48, the clock input amplifier 56, the dividers 64 and 66, the counter 68, the phase detector 76, and the error amplifier 78. The power logic circuit 222 receives the low level from the Vcc_DIG input 206 and the high level from the OSC_ON input 224 and controls the RF power gate 208 to prevent the power from the Vcc_RF input 202 from passing to the first downconverter 12, the second downconverter 14, and the VCO 62; controls the first clock power gate 210 to pass power from the Vcc_RF input 202 to the reference amplifier/oscillator 74; controls the output power gate 212 to prevent the power from the Vcc_OUT input 204 from passing to the I and Q output amplifiers 52 and 54; and controls the second clock power gate 214 to pass power from the Vcc_out input 204 to the clock output amplifier 72.

The manner of supplying power to the integrated circuit 10 describe herein meets the requirement of having separate power inputs for the RF, digital, and output circuits, thereby minimizing coupling of unwanted signals between the circuits, and providing a low power standby mode where the reference signal continues to be provided by the integrated circuit 10 through the path 84. The OSC_ON input 224 and the sampling clock input (FIG. 1) may be tied together, thereby eliminating a connection pin. In a preferred embodiment, the GPS DSP IC 124 (FIG. 2) uses a single pin connected to the path 58 (FIGS. 1 and 2) to issue a sampling clock signal to the RF GPS IC 10 for the ALL ON mode and to issue the signal for the OSC_ON input 224 for the ALL OFF and standby modes since the sampling clock will be required only in the ALL ON mode.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for selecting an operational mode of an electronic device, comprising steps of:
   receiving a first voltage input having a first first voltage state or a second first voltage state, a second voltage input having a first second voltage state or a second second voltage state, and a third voltage input having a first third voltage state or a second third voltage state;
   operating a first circuit with power drawn from said first voltage input only when said first voltage input has said first first voltage state;
   operating a second circuit with power drawn from said second voltage input only when said second voltage input has said first second voltage state and said first voltage input has said first first voltage state; and
   operating a third circuit with power drawn from said second voltage input only when said second voltage input has said first second voltage state and either of said first voltage input has said first first voltage state and said third voltage input has said first third voltage state.

2. The method of claim 1, wherein:
   said device operates in a normal operational mode only when said first, said second, and said third circuits are operating; and
   said device operates in a standby mode only when said third circuit but not said first circuit and not said second circuit are operating.

3. The method of claim 2, further including steps of:
   downconverting a radio frequency (RF) signal in said normal mode with said first and said second circuits; and
   issuing a reference signal in said standby mode from said third circuit.

4. The method of claim 3, wherein:
   said RF signal is a global positioning system (GPS) signal.

5. The method of claim 4, wherein:
   said first, said second, and said third circuits are realized in a first integrated circuit.

6. The method of claim 3, further including a step of:
   issuing said third voltage input and a clock signal from a single pin of a second integrated circuit; and
   receiving said clock signal at said first circuit for use in providing a downconverted said RF signal from a first integrated circuit.

7. The method of claim 6, wherein:
   said second integrated circuit is a GPS digital signal processor (DSP) integrated circuit.

8. An electronic apparatus having selected operational modes, comprising:
   a first circuit for receiving a first voltage input having a first first voltage state or a second first voltage state and operating with power drawn from a first voltage input only when said first voltage input has said first first voltage state;
   a second circuit for receiving said first voltage input and a second voltage input having a first second voltage state or a second second voltage state, and for operating with power drawn from said second voltage input only when said second voltage input has said first second voltage state and said first voltage input has said first first voltage state; and
   a third circuit for receiving said first voltage input, said second voltage input, and a third voltage input having a first third voltage state or a second third voltage state; and for operating with power drawn from said second voltage input only when said second voltage input has said first second voltage state and either of said first voltage input has said first first voltage state and said third voltage input has said first third voltage state.

9. The apparatus of claim 8, wherein:

the apparatus operates in a normal operational mode only when said first, said second, and said third circuits are operating; and the apparatus operates in a standby mode only when said third circuit but not said first circuit or said second circuit are operating.

10. The apparatus of claim 9, wherein:

the first and the second circuits are for cooperating for downconverting a radio frequency (RF) signal in said normal mode; and the third circuit is for issuing a reference signal in said standby mode.

11. The apparatus of claim 10, wherein:

said RF signal is a global positioning system (GPS) signal.

12. The apparatus of claim 11, wherein:

the first, the second, and the third circuits are realized in a first integrated circuit.

13. The apparatus of claim 10, further including:

a second integrated circuit for issuing said third voltage input and a clock signal from a single pin; and receiving said clock signal at said first circuit for use in providing a downconverted said RF signal from a first integrated circuit.

14. The apparatus of claim 13, wherein:

said second integrated circuit is a GPS digital signal processor (DSP) integrated circuit.

* * * * *